US011053728B2

(12) United States Patent
Zucker et al.

(10) Patent No.: US 11,053,728 B2
(45) Date of Patent: Jul. 6, 2021

(54) FRAME ASSEMBLY FOR SHEET MATERIAL

(71) Applicant: John Zucker, London (GB)

(72) Inventors: John Zucker, London (GB); John Brades, Sawbridgeworth (GB); Andrew New, Hethersett (GB); Adrian Toon, Ross-on-Wye (GB)

(73) Assignees: John Zucker, London (GB); John Brades, Sawbridgeworth (GB)

( * ) Notice: Subject to any disclaimer, the term of this patent is extended or adjusted under 35 U.S.C. 154(b) by 0 days.

(21) Appl. No.: 16/346,325

(22) PCT Filed: Oct. 30, 2017

(86) PCT No.: PCT/GB2017/053259
§ 371 (c)(1),
(2) Date: Apr. 30, 2019

(87) PCT Pub. No.: WO2018/078394
PCT Pub. Date: May 3, 2018

(65) Prior Publication Data

US 2019/0301233 A1 Oct. 3, 2019

(30) Foreign Application Priority Data

Oct. 31, 2016 (GB) ...................................... 1618370

(51) Int. Cl.
*E06B 3/58* (2006.01)
*E06B 3/54* (2006.01)
(Continued)

(52) U.S. Cl.
CPC ............ *E06B 3/585* (2013.01); *E06B 3/5454* (2013.01); *E06B 3/549* (2013.01); *E06B 3/5821* (2013.01); *E06B 3/6621* (2013.01); *E06B 5/12* (2013.01)

(58) Field of Classification Search
CPC ........ E06B 3/585; E06B 3/5454; E06B 3/549; E06B 3/5821; E06B 3/6621; E06B 5/12; E06B 3/64
See application file for complete search history.

(56) References Cited

U.S. PATENT DOCUMENTS 2,809,728 A * 10/1957 Olson .................. E06B 3/5454 52/204.597
5,444,958 A 8/1995 Lu
(Continued)

FOREIGN PATENT DOCUMENTS

DE 202017101955 U1 * 7/2018 ............. E06B 3/549
EP 2918764 A1 * 9/2015 ........... E06B 3/5454
(Continued)

OTHER PUBLICATIONS

Application No. SG11201903844Q , Search Report and Written Opinion, dated Aug. 10, 2020, 10 pages.

*Primary Examiner* — Babajide A Demuren
(74) *Attorney, Agent, or Firm* — Kilpatrick Townsend & Stockton LLP

(57) ABSTRACT

The application describes a frame assembly comprising: a first inner frame section adapted to be fitted to a first peripheral portion of a first surface of sheet material, the first peripheral portion is adjacent a peripheral edge; a second, separate inner frame section adapted to be fitted to a second peripheral portion of a second surface of sheet material, the second peripheral portion is adjacent a peripheral edge, and the second surface is opposite the first surface; and an outer frame section for receiving the sheet material with the inner frame sections fitted thereto, the outer frame section comprising first and second projections. The first frame section defines a space adapted to receive the first projection of the outer frame section, the space of the first inner frame section
(Continued)

cooperates with the received first projection to restrict movement of the first inner frame section relative to the outer frame section.

24 Claims, 6 Drawing Sheets

(51) Int. Cl.
*E06B 3/66* (2006.01)
*E06B 5/12* (2006.01)

(56) References Cited

U.S. PATENT DOCUMENTS

| | | | | | |
|---|---|---|---|---|---|
| 6,434,905 | B1 * | 8/2002 | Sprague | E06B 3/02 49/501 |
| 2002/0100234 | A1 * | 8/2002 | Sprague | E06B 3/5454 52/208 |
| 2006/0070318 | A1 * | 4/2006 | Chen | E06B 3/5454 52/204.65 |
| 2007/0256383 | A1 | 11/2007 | Kim | |
| 2010/0205880 | A1 | 8/2010 | Lin | |
| 2011/0030295 | A1 | 2/2011 | Morley | |
| 2015/0007514 | A1 * | 1/2015 | Lathief | E04F 11/1812 52/204.66 |
| 2015/0043965 | A1 * | 2/2015 | Mao-Cheia | F16B 5/0685 403/338 |

FOREIGN PATENT DOCUMENTS

| | | | | |
|---|---|---|---|---|
| EP | 3372748 | B1 * | 9/2019 | E06B 3/5454 |
| FR | 2686963 | A1 * | 8/1993 | E06B 3/88 |
| JP | 2008031654 | A | 2/2008 | |
| JP | 2014031617 | | 2/2014 | |
| WO | 97/26179 | A1 | 7/1997 | |
| WO | 02/10544 | A1 | 2/2002 | |
| WO | 2005/010310 | A1 | 2/2005 | |

* cited by examiner

FRAME ASSEMBLY FOR SHEET MATERIAL

CROSS-REFERENCE TO RELATED APPLICATIONS

This application is a U.S. 371 of International Application No. PCT/GB2017/053259, filed Oct. 30, 2017, which claims the benefit of GB Application No. 1618370.9, filed Oct. 31, 2016, the entire contents of which are hereby incorporated in their entirety for all purposes.

FIELD OF THE INVENTION

This invention relates to an assembly for sheet material, especially sheet panels for use in construction.

BACKGROUND OF THE INVENTION

Panel structures comprising sheet material and using supporting frames are employed in numerous situations, especially in the field of construction. For example, panel structures are used in the fabrication of windows, interior/exterior walls including curtain walling and partition walls, and doors. These structures may use any combination of glass, transparent, semi-transparent, translucent, and/or solid metal/polymer sheets.

The process of manufacturing such panel structures typically comprises providing material in large sheets and cutting these sheets to a particular size that fits a given size of supporting frame. The sheets may then be fitted into the supporting frame(s) using various methods depending on the structure of the frame(s).

Numerous frames are known that accommodate the reception of single sheets of material. A panel structure comprising a single sheet of material supported by a frame is typically referred to as a 'single panelled' structure. More recently, frames have also been designed to accommodate more than one sheet of material. As a result, panel structures comprising two generally parallel sheets of material supported by a frame are now widely known and referred to as 'double panelled' structures. Similarly, 'triple panelled' structures have been demonstrated. Where the material supported in the frame is glass, the structure is generally referred to as "single glazed", "double glazed" or "triple glazed" structure.

For both single-panelled and double-panelled structures, the typical method of installation comprises fitting the sheet material to frame sections, commonly in the form of extruded articles that may be fitted along the peripheral edges of the sheet material. The resultant panel and frame structure may then be mounted in a corresponding receiving structure or framework, such as a wall or roof.

For double panelled structures, especially double-glazed windows, it is known to provide a spacer bar between the two sheets of material to ensure a correct gap between the sheets, and to seal the two sheets together to form a heat or sound barrier (i.e. a sealed unit). Such spacer bars have also been provided with perforations containing desiccant material, which absorb moisture in the trapped air to prevent condensation forming in the space between the sheets. Air can also be replaced with an inert gas such as argon to further improve insulation.

The method steps associated with the manufacture and installation of such panel structures, for example cutting, handling, edge treating, carrying, fixing and installation, in addition to the long term performance of such structures, provide many difficulties. In particular, as a result of the physical attributes of typical panel structures, such as fragility and weight, numerous problems arise. These problems can create deficiencies in, for example, quality, strength, durability and air/water-tightness, and minimising such deficiencies results in additional manufacturing/installation complexity and cost.

Furthermore, panels structures (and their component sheets) used in civil construction may be subjected to sudden impact forces of considerable magnitude or unwanted attempts to remove the sheet material from the supporting framework.

It is, therefore, desirable to realise a supporting frame assembly for sheet material that provides for reduced installation/manufacturing complexity and cost. Furthermore, it is also desirable for such frame assembly to provide significantly improved levels of strength and resistance against impact forces (for example bomb blasts) and/or unwanted attempts to remove the sheet material.

SUMMARY OF THE INVENTION

According to a first aspect of the invention, there is provided a frame assembly for sheet material comprising a panel defined by opposing surfaces, and one or more peripheral edges extending between the opposing surfaces, the opposing surfaces terminating at the one or more peripheral edges, the frame assembly comprising: a first inner frame section adapted to be fitted to a first peripheral portion of a first surface of sheet material, wherein the first peripheral portion is adjacent a peripheral edge; a second, separate inner frame section adapted to be fitted to a second peripheral portion of a second surface of sheet material, wherein the second peripheral portion is adjacent a peripheral edge, and wherein the second surface is opposite the first surface; an outer frame section for receiving the sheet material with the inner frame sections fitted thereto, the outer frame section comprising first and second projections, wherein the first inner frame section defines a space adapted to receive the first projection of the outer frame section, whereby the space of the first inner frame section cooperates with the received first projection to restrict movement of the first inner frame section relative to the outer frame section.

Thus, the invention provides a frame assembly for sheet material that reduces installation/manufacturing complexity and cost. Furthermore, a frame assembly according to the invention provides improved levels of resistance against sudden impact forces and/or unwanted attempts to remove or break through the sheet material. By applying an inner frame section (referred to by the Applicant as "Edge Retention Profile") near the edge of the outer face of the sheet(s), a combined cross-sectional shape can be formed wherein the cross-sectional shape is designed to create, form or otherwise define a space for receiving a projection of an outer frame section. Thus, the space and received projection may cooperate to hinder relative lateral and/or vertical movement. In this way, lateral and vertical movement of the sheet material fitted to the inner frame section may be hindered or prevented when the outer frame section receives the sheet material with the inner frame sections fitted thereto. Also, externally applied forces may be distributed over the surface of the inner frame sections.

It is also noted that the inner frame sections may increase an available area for bonding to the sheet material than would otherwise be available (e.g. if no inner frame sections were employed and only an outer frame provide the bonding area).

Proposed concepts may also help to eliminate or relieve a need for specialist installation personnel. Further, embodiments may avoid the need to apply silicone or wet sealant/adhesive between the sheet material and the frame, enabling installation time to be reduced. Eliminating a need for silicone or wet sealant/adhesive application also addresses the problem that application can typically only be done in dry and warm conditions.

The proposed invention provides a system which moves quality requirements towards the manufacturing stage(s), rather than relying on unpredictable or variable results due to the application of 'wet' products on site. For example, inner frame sections may be fitted to sheet material in a controlled manufacturing environment (which may have specialist equipment available for example) so as to facilitate accurate and high-quality products that are adapted and ready to be installed into (e.g. received by) outer frame sections.

The frame assembly may be fully "bi-directional" in its performance. That is, it may be able to withstand a bomb blast in both directions (it should be noted here that the shock waves caused by bomb blasts do generate inward and outward forces on a window).

With some embodiments, frames can be subsequently adapted to accommodate changes of sheet material thickness or change in the number of panels of sheet material without having to remove the frames from the wall, and with full access from the inside of the building.

Preferably, the space of first inner frame section and the first projection of the outer frame section are adapted to have complementary or interlocking geometries.

In an embodiment, the first inner frame section may have an S-shaped or Z-shaped cross-sectional shape. Such an inner frame section may be formed via extrusion and/or bending of an elongated element.

In another preferred version, the space of the first inner frame section is larger than the received first projection in at least one dimension by a tolerance value. By way of example, the tolerance value may be greater than or equal to 5 mm, and may, in some embodiments, be greater than or equal to 10 mm. By being larger than the received projection, the space may cater for manufacturing and/or installation variations. Also, room for expansion of the material(s) may be provided.

In an embodiment, the outer frame section may have a mouth portion into which the sheet material with the inner frame section fitted thereto is adapted to be received, and the sheet material with the inner frame section fitted thereto may be wider than the mouth portion.

The cross-sectional shape of the outer frame section may be substantially U-shaped. To enhance a frictional grip, there may be roughened or serrated surfaces on abutting faces of the inner frame sections and outer frame section. Such serration could be fine or delicately indented/patterned, and the faces may have matching indentations.

In some embodiments, the first inner frame section may comprise a removed corner portion which defines the space adapted to receive the first projection of the outer frame section. Also, the removed corner portion may define a recess or seat along the longitudinal length of the first inner frame section, and the first projection of the outer frame section may comprise a lip which, when received by the space, engages over the recess or seat. The lip can be useful in preventing access and preventing the first inner frame section (and the sheet material fitted thereto) from being lifted out of the outer frame section.

In an embodiment, the first inner frame section may comprise a groove, or series of grooves, which defines the space adapted to receive a respective projection, or projections, of the outer frame section, the projection(s) comprising a tongue or tongues.

The outer frame section may comprise a pocket or recess adapted to receive the sheet material with the inner frame section fitted thereto, and the cross-sectional shape of the pocket may be adapted to substantially match that of the sheet material with the inner frame section fitted thereto. Such an arrangement may reduce the ability of an inner frame section to be levered out of the internal space (e.g. pocket or recess) within which the outer frame section receives the inner frames sections (with sheet material fitted thereto). To lever an inner frame section from its assembled position, one would have to prise apart the inner frame section from the outer frame section along its perimeter. Such an action is seriously impeded since any rigid implement used to provide a levering force would be unable to 'wrap' around the perimeter of the inner frame section in order to separate it from the outer frame section.

In an embodiment, the outer frame section may comprise a second projection, and the second inner frame section may define a space adapted to receive the second projection of the outer frame section, whereby the space of the second inner frame section cooperates with the received second projection to restrict movement of the second inner frame section relative to the outer frame section.

The sheet material may comprise first and second panels. In such an embodiment, the first inner frame section may be adapted to be fitted to a first peripheral portion of a first surface of the first panel, wherein the first peripheral portion is adjacent a peripheral edge of the first panel. Further, the second inner frame section may be adapted to be fitted to a second peripheral portion of a second surface of the second panel, wherein the second peripheral portion is adjacent a peripheral edge of the second panel, Also, the second surface of the second panel may be adapted to face in an opposite direction to that of the first surface of the first panel.

The frame assembly may be a window with single frame, a single composite window carrying more than one panel of sheet material, a curtain wall facade or door frame assembly and the sheet material may be at least semi-transparent. There may thus be provided a multi-panelled assembly. The use may be in a wall, floor or overhead assembly. Further, proposed concepts may enable a sealed unit to be formed which is desirable for heat and sound insulation. It is envisaged that adapting an outer frame section to receive one, two, three or more parallel sheets or panels (with inner frame sections fitted to outer surfaces) will be of particular advantage. Further to this, some inner frame sections may also be provided with moisture absorbing means therebetween. In this way, condensation can be prevented from forming in the space between sheets/panels.

The inner frame sections and the outer frame section may be made of aluminium, steel, UPVC, fibre-reinforced cement, plastic or other polymer material.

In addition, the frame assembly has the ability to accommodate new (replacement) sealed structures of different sizes (length or width). For example, embodiments may cater for the insertion of ballistic resistant or break-in resistant sheets of material in straight-forward manner. Such additional sheets of material may be made from Polycarbonate for example.

In preferred embodiments of the invention, one can apply much greater compressive or impact forces than in conventional systems, as the outer frame contacts (and thus applies force/pressure to) the inner frame sections rather than the sheet material (which may include glass for example).

The cross-sectional shape of the outer frame section may be substantially U-shaped. However, the cross-sectional shape of the outer frame section may instead be selected from circular, regular polygonal and irregular polygonal.

A window or door frame assembly may be provided by the invention. Thus, in such an assembly the sheet material may be glass, clear, opaque, translucent or otherwise. The sheet material may be a panel of one material or sections of different material, placed side by side in one frame, or placed above or below in any combination. Alternatively, the frame assembly may include blinds.

By way of example, the inner and outer frame sections may be made of aluminium, steel or other metals. Alternatively, they may be formed from UPVC or other plastics or a polymer material. Of course, the inner and outer frame sections may also be formed from any combination of these materials.

Although the above discussion might suggest that the frame assembly is made up of section lengths fitted around the sides of a panel, with corner pieces potentially completing the inner frame, the inner frame sections could have mitred ends if so desired, as with the outer frames. Furthermore, the inner frame sections could extend around a corner of the sheet material so that in one embodiment the inner frame is made up of four L-shaped inner frame sections (that may be thought of as corner pieces). Thus, if a corner piece extends along a significant length of the sheet material, then functionally it may be considered as an "inner frame section" within the terms of the invention as defined herein.

Linked to the above method, according to yet another aspect of the invention, there is provided an inner frame section for a frame assembly for sheet material, the sheet material comprising a panel defined by opposing surfaces, and one or more peripheral edges extending between the opposing surfaces, the opposing surfaces terminating at the one or more peripheral edges, wherein the inner frame section is adapted to be fitted to a first peripheral portion of a first surface of sheet material, wherein the first peripheral portion is adjacent a peripheral edge, and wherein the first inner frame section defines a space adapted to receive a projection of an outer frame section of the frame assembly, whereby the space of the first inner frame section cooperates with the respective received projection to restrict movement of the inner frame section relative to the outer frame section.

Thus, there may be provided an individual inner frame section (or Edge Retention Profile) for fitting to an outer planar surface of a panel of sheet material, preferably near a peripheral edge of the panel of sheet material. By being adapted to be fitted to a panel of sheet material, an inner frame section may be adapted to provide a particular cross-sectional shape when fitted. The cross-sectional shape that results from fitting the inner frame section to a panel of sheet material may be design so as to provide a geometry or shape that is adapted to substantially match or complement that of an outer frame section. For example, the inner frame section may define a space or recess that is adapted to receive a respective projection of an outer frame section when the inner frame section and outer frame section are brought or fitted together. By receiving the projection, the matching or complementary shapes of the space/recess and the projection may cooperate so as to restrict, hinder or prevent movement of the inner frame section relative to the outer frame section.

Thus, the space of the inner frame section and the projection of the outer frame section may be adapted to have complementary or interlocking geometries. Substantially matching geometries may thus be employed for the inner and outer frame sections so as to form an interconnection which hinders or prevents an inner frame section from being removed from the outer frame section.

Also, the space of the inner frame section may be larger than the received projection in at least one dimension by a tolerance value, and preferably the tolerance value may be greater than or equal to 5 mm.

The inner frame section may comprise a removed corner portion which defines the space adapted to receive a projection of the outer frame section. Further, the removed corner portion may define a recess or seat along the longitudinal length of the inner frame section, and the projection of the outer frame section may comprise a lip which, when received by the respective space, engages over the recess or seat. For example, the inner frame section may be mitred at one or more corners so as to define a recess or seat for receiving a lip or projection of an outer frame section.

An embodiment may comprise a groove which defines the space adapted to receive the projection of the outer frame section, the projection comprising a tongue.

Thus, there may be provided a frame assembly for sheet material comprising a panel defined by opposing planar surfaces, and one or more peripheral edges extending between the opposing planar surfaces, the opposing planar surfaces terminating at the one or more peripheral edges, the frame assembly comprising: a first inner frame section according to an embodiment and adapted to be fitted to a first peripheral portion of a first planar surface of sheet material, wherein the first peripheral portion is adjacent a peripheral edge; a second, separate inner frame section adapted to be fitted to a second peripheral portion of a second planar surface of sheet material, wherein the second peripheral portion is adjacent a peripheral edge, and wherein the second planar surface is opposite the first planar surface; an outer frame section for receiving the sheet material with the inner frame sections fitted thereto, the outer frame section comprising first and second projections.

According to another aspect of the invention, there is provided a method of constructing a framed panel structure having one or plural parallel panels, wherein a panel comprises a panel defined by opposing surfaces, and one or more peripheral edges extending between the opposing surfaces, the opposing surfaces terminating at the one or more peripheral edges, and wherein the method comprises: fitting a first inner frame section to a first peripheral portion of a first surface of a panel, wherein the first peripheral portion is adjacent a peripheral edge; fitting a second, separate inner frame section to a second peripheral portion of a second surface of a panel, wherein the second peripheral portion is adjacent a peripheral edge; arranging the second surface to face in an opposite direction to that of the first surface; and receiving, in an outer frame section, the sheet material with the first inner frame section fitted thereto, such that a space defined by the first inner frame section receives a first projection of the outer frame section, whereby the space of the first inner frame section cooperates with the received first projection to restrict movement of the received first inner frame section relative to the outer frame section.

The step of receiving may further comprise: receiving, in an outer frame section, the sheet material with the first inner frame section fitted thereto, such that a space defined by the second inner frame section receives a second projection of the outer frame section, whereby the space of the second inner frame section cooperates with the received second projection to restrict movement of the received second inner frame section relative to the outer frame section.

BRIEF DESCRIPTION OF THE DRAWINGS

Examples of the invention will now be described in detail with reference to the accompanying drawings, in which.

DETAILED DESCRIPTION

Figure 1:
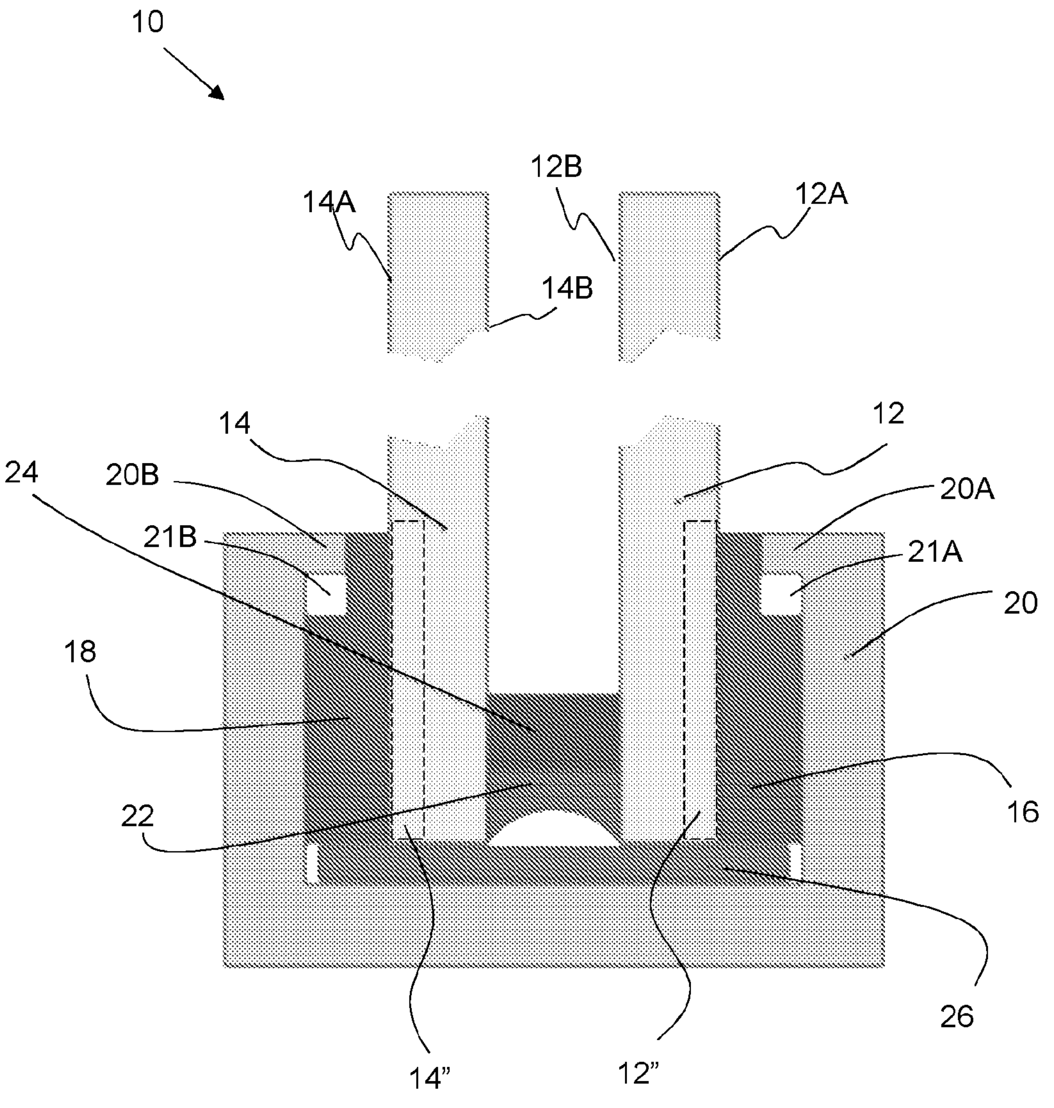
FIG. 1 illustrates a cross-sectional view of a frame assembly according to an embodiment, wherein the left-hand side of the diagram is the external/outside facing side.

The following description provides a context for the description of elements and functionality of the invention and of how elements of the invention can be implemented.

It should be understood that the Figures are merely schematic and are not drawn to scale. It should also be understood that the same reference numerals are used throughout the Figures to indicate the same or similar parts.

Proposed are concepts for reducing installation/manufacturing complexity and cost of a frame assembly for sheet material.

The invention is at least partly based on the insight that supplementary articles/unit may be attached to a surface of sheet material so as to provide a predetermined/desired cross-sectional shape. The resultant cross-sectional shape of the sheet material and attached article/unit may be designed to receive a projection of an outer frame section. In other words, the resultant cross-sectional shape of the sheet material and attached article/unit may have a geometry that complements or matches that of an outer frame section. The matching or complementary shapes may then cooperate to restrict or prevent relative movement of the article/unit and the outer frame section. In this way, an outer frame section may be applied to sheet material to securely position and hold the sheet material within a frame.

The invention may thus employ the concept that a substantially flat, planar surface of sheet material can be converted to provide a recess or space for providing an interlocking arrangement, and the conversion may be achieved by fitting or attaching a specifically shaped/designed article/unit to the flat, planar surface of the sheet material.

Illustrative embodiments may be utilised in many different types of frame assemblies, including window frames, curtain walls, roof glazing, door frames, partitions, barriers, etc.

Referring to FIG. 1, there is depicted a frame assembly 10 according to an embodiment of the invention. Here, the frame assembly 10 is for securely holding two substantially parallel panels of sheet material. Also, the left-hand side of the diagram is assumed to be an external/outside facing side.

For the avoidance of doubt, and for an improved understanding, reference to a panel, sheet panel, or single sheet/panel of sheet material should be taken to refer to a panel of sheet material which comprises a body (or panel) defined by opposing surfaces, and one or more peripheral edges extending between the opposing surfaces, the opposing surfaces terminating at the one or more peripheral edges. The peripheral edge(s) therefore define the outer perimeter of the flat body (or panel). Reference to a peripheral portion of a surface of a sheet panel (or panel of sheet material) should therefore be taken to refer to a portion of the surface that is situated adjacent a peripheral edge of the sheet panel. In this way, a peripheral portion of a surface will therefore be understood as being located at or near the edge of the surface, such that a boundary of the peripheral portion co-locates with a peripheral edge or is situated very close to a peripheral edge (i.e. is only separated from the peripheral edge by a small distance e.g. less than 10 cm, preferably less than 5 cm, even more preferably less than 2 cm, and yet more preferably less than 1 cm). Although it is envisaged that the opposing surfaces may be substantially planar (so that the body is substantially flat for example), it that embodiments are foreseen wherein the opposing surfaces are not planar but are instead curved, convex, concave or the like.

A first inner frame section 16 comprises an elongate extruded member 16 that is adapted to be fitted to a first peripheral portion 12" of a first planar surface 12A of a first panel 12 of sheet material. As will be understood from the preceding paragraph, the first peripheral portion 12" is adjacent a peripheral edge of the first panel 12. Here, the peripheral edge faces vertically downwards (i.e. is arranged substantially horizontally) in FIG. 1. By way of example, the first inner frame section 16 may be fitted to the first peripheral portion 12" of the first planar surface 12A using any suitable fitting or securing means, including, for example, adhesive, cement, epoxy resin, UV-curing adhesive, screws, rivets, pins, nails, fasteners, bolts, etc. In this example, an adhesive is employed, and the adhesive comprises a UV-curing acrylic resin.

A second, separate inner frame section 18 comprises an elongate extruded member 18 that is adapted to be fitted to a second peripheral portion 14" of a second planar surface 14A of a second panel 14 of sheet material. The second peripheral portion 14" is adjacent a peripheral edge of the second panel 14. Here, the peripheral edge of the of the second panel in question faces vertically downwards (i.e. is arranged substantially horizontally) in FIG. 1. Again, by way of example, the second inner frame section 18 may be fitted to the second peripheral portion 14" of the second planar surface 14A using any suitable fitting or securing means, including, for example, adhesive, cement, epoxy resin, UV-curing adhesive, screws, rivets, pins, nails, fasteners, bolts, etc. In this example, an adhesive is employed, and the adhesive comprises a UV-curing acrylic resin.

An outer frame section 20 is provided for receiving the first 12 and second 14 panels 12,14 of sheet material with the first 16 and second 18 inner frame sections fitted thereto, respectively.

The outer frame section comprises first 20A and second 20B projections extending inwardly towards each other. In this example, the first 20A and second 20B projections are each in the form of an inwardly projecting lip 20A, 20B.

The first 16 and second 18 inner frame sections each define a space 21A, 21B adapted to receive a respective projection 20A, 20B of the outer frame section 20, whereby the spaces 21A, 21B of the first 16 and second 18 inner frame sections cooperate with the respective received projections 20A,20B to restrict movement of the received inner frame sections 16,18 relative to the outer frame section 20.

More specifically, in the embodiment of FIG. 1. The first 16 and second 18 inner frame sections each comprise a removed corner portion which defines the space 21A, 21B adapted to receive a respective projection 20A, 20B of the outer frame section 20. In this way, the removed corner of each of the first 16 and second 18 inner frame sections defines a recess or seat along the longitudinal length of the inner frame section 16,18. When received by the respective space 21A, 21B, the lip 20A, 20B engages over the recess or seat. Thus, when the inner frame sections 16,18 (with the first 12 and second 14 panels respectively fitted thereto) are received by the outer frame section 20, the lip 20A20B prevents the inner frame sections 16,18 (and the panels 12,14 of sheet material fitted thereto) from being lifted out of the outer frame section 20.

In this example, the spaces 21A, 21B of first 16 and second 18 inner frame sections and the respective projections 20A, 20B of the outer frame section 20 comprise substantially complementary (i.e. matching) or interlocking geometries. However, it is noted that, in this example, the spaces 21A, 21B of the first 16 and second 18 inner frame sections are adapted to be larger than the respective received projections 20A, 20B in at least one dimension. More specifically, in the embodiment of FIG. 1, the spaces 21A, 21B of the first 16 and second 18 inner frame sections are larger than the respective received projections 20A, 20B in the vertical direction by around 5 mm. This difference in dimension caters for manufacturing tolerances and/or installation variations by providing extra vertical room for the projections 20A, 20B to fit in the respective spaces 21A, 21B. Of course, it will be understood that other values of the size difference may be employed, such as about 10 mm or about 15 mm for example, and the size difference need not be in the vertical direction (e.g. it may be in the horizontal direction, depth direction, or any combination of thereof). The additional space provided by making the spaces 21A, 21B to be larger than the respective received projections 20A, 20B may additionally (or alternatively) be adapted to cater for gradual or sudden expansion of components (such as the inner frame sections and/or the panels of sheet material for example).

In the example embodiment of FIG. 1, the cross-sectional shape of the outer frame section 20 is substantially U-shaped. To enhance a frictional grip, there may be roughened or serrated surfaces on abutting faces of the inner frame sections 16,18 and outer frame section 20. Such serration could be fine or delicately indented/patterned, and the faces may have matching indentations.

It is also noted that the outer frame section 20 of FIG. 1 comprises a mouth portion (defined by the lips 20A, 20B into which the sheet material 12,14 (with the inner frame sections 16,18 fitted thereto) is adapted to be received. Due to each lips 20A,20B being adapted to engage over a recess or seat formed in a respective inner frame portion, the mouth portion is narrower than the combined width of the sheet material 12,14 with the inner frame sections 16,18 fitted thereto.

Thus, it will be understood that the cross-sectional shape of the outer frame section 20 defines a pocket or recess adapted to receive the sheet material 12,14 with the inner frame sections 16,18 fitted thereto. Furthermore, the inner cross-sectional shape of the pocket (e.g. the cross-sectional shape defined by the inner or inwardly-facing surfaces of the outer frame portion 20) is adapted to substantially match the outer cross-sectional shape of the sheet material 12,14 with the inner frame sections 16,18 fitted thereto (e.g. the cross-sectional shape defined by the outer or outwardly-facing surfaces of the combine sheet material 12,14 and inner frame sections 16,18). Such an arrangement may reduce the ability of an inner frame section to be levered out of the internal space (e.g. the pocket or recess) of the outer frame section 20. To lever an inner frame section from its assembled arrangement (as depicted in FIG. 1), one would have to prise apart the inner frame section from the outer frame section 20 along its perimeter. Such an action is seriously impeded since any rigid implement used to provide a levering force would be unable to 'wrap' around the perimeter of the inner frame section in order to separate it from the outer frame section.

Provided between the first 12 and second 14 panels of sheet material is an elongated structural spacer element 24. This helps to maintain the separation between the panels 12,14 of sheet material and ensures that the inner frame sections 16,18 are held locked within the outer frame section 20. It may therefore be preferable, although not necessarily essential (e.g. depending on application), for the structural spacer element 24 to be designed to withstand high loads (e.g. to withstand the same loads as the frame assembly). By way of example only, the spacer element 24 may be formed from monolithic material that is chosen for its compressive strength and low heat conductivity properties. Alternatively, the spacer bar may be formed from a composite material that is designed and/or chosen so as to provide the required compressive strength and heat conductivity properties.

For instance, the spacer bar may be made of a range of materials which provide a structural strength of at least 90 N per mm of length and a low thermal conductivity to minimise thermal bridging. Materials such as polycarbonate, ABS or other thermoplastics, in solid or cellular cross-sectional form could be used. For a typical thermoplastic, the outer shape of the cross section could be basically rectangular and similar in dimension to the amount of overlap between the sheet material and frame in the plane of the sheet, i.e. 37.5 mm. Normal to the plane of the sheet, the dimension could be 16 mm approximately, so as to optimise the thermal resistivity of the gas-filled gap between the sheets 12,14. In the case of a 37.5 mm×16 mm spacer, at least 25% of the cross section should preferably comprise columns spanning the 16 mm direction.

Directly below the spacer element 24, and extending between the first 12 and second 14 panels of sheet material there is provided a seal element 22 which is adapted to form a sealed connection between the first 12 and second 14 panels (so as to prevent water ingress for example).

Sandwiched between the bottom (i.e. downwardly facing edges of the inner frame sections 16,18 and panels 12,14) and the outer frame section 20 is a packer 26. The packer assists correct placement of the inner frame sections 16,18 and panels 12,14 within the outer frame section 20. The packer 20 need not be continuous.

By way of example, the frame assembly of FIG. 1 may be employed in a window or door frame assembly and the sheet material may be at least semi-transparent, partially opaque, or translucent. There may be thus be provided a multi-panelled assembly window or door frame assembly. Embodiments may be employed in other assemblies, such as barriers, curtain walling, roof tiling, roof lights, ceilings, suspended ceilings, partition walls, etc.

Further, proposed concepts may enable a sealed unit to be formed which is desirable for heat and sound insulation. It is envisaged that adapting an outer frame section to receive two or three parallel sheets or panels (with inner frame sections fitted to outer planar surfaces) will be of particular advantage. However, proposed concepts are equally applicable to adapting an outer frame section to receive a single sheet or panel (with an inner frame section fitted to each of the opposing/opposite planar surfaces of the single sheet/panel).

It is noted that for embodiments adapted to receive two, three or more sheets or panels, the sheets/panels may be provided with moisture absorbing means therebetween. In this way, condensation can be prevented from forming in the space between sheets/panels. Also, a spacer or spacing element may be provided between adjacent sheets/panels for assisting and/or maintaining the correct positioning and separation of the sheet material. The moisture absorbing means may be provided in a perforated chamber filled with desiccant or desiccant foam tape formed in such a spacer or spacing element.

Although the embodiment of FIG. 1 has been described as comprising an outer frame section having a substantially U-shaped cross-sectional shape, it should be understood that, in other embodiment, the cross-sectional shape of the outer frame section may be selected from circular, regular polygonal and irregular polygonal.

The inner frame sections and the outer frame section may be made of aluminium, steel, UPVC, plastic or other polymer material.

In addition, the frame assembly has the ability to accommodate new or replacement sealed structures of different sizes (length or width). For example, embodiments may cater for the insertion of ballistic resistant or break-in resistant sheets of material in straight-forward manner. Such additional sheets of material may be made from Polycarbonate for example.

The sheet material may comprise a panel of one material or sections of different material, placed side by side in one frame, or placed above or below in any combination. Alternatively, the frame assembly may include blinds.

Although the above description may suggest that a completed frame assembly may be made up of section lengths fitted around the sides of a panel, with corner pieces potentially completing the inner frame, the inner frame sections could have mitred ends if so desired, as with the outer frames. Furthermore, the inner frame sections could extend around a corner of the sheet material so that in one embodiment the inner frame is made up of four L-shaped inner frame sections (that may be thought of as corner pieces). Thus, if a corner piece extends along a significant length of the sheet material, then functionally it may be considered as an "inner frame section" within the terms of the invention as defined herein.

To provide suitable strength and allow for ease of manufacture, for example by extrusion, an inner frame section of an embodiment may be made of aluminium, steel, UPVC or other plastics or polymer material. Such materials are purely exemplary since an inner frame section may be formed from any suitable material.

By way of further example, in the illustrated embodiment of FIG. 1, the inner frame sections 16,18 are each formed from aluminium and each have (maximum) thickness of between 2 mm-50 mm. Of course, it will be appreciated that the inner frame sections may be of greater, lesser or varying thickness in alternative embodiments.

Although the embodiment of FIG. 1 has been depicted and described as employing inner frame sections each having a removed corner for receiving a lip portion of the outer frame section, it is to be understood that other embodiments may employ other combinations of matching or complementary geometries. For example, in an alternative embodiment, at least one of the first and second inner frame sections may comprise a groove which defines the space adapted receive a respective projection of the outer frame section, the respective projection comprising a tongue. In other words, a tongue and groove arrangement may be employed so that the tongue and groove are adapted to cooperate with each other so as to restrict relative movement between the inner and outer frame sections.

Further, although the embodiment of FIG. 1 has been depicted and described as employing two (i.e. first and second) inner frames sections that define a space for receiving a respective projection of the outer frame section, it is to be understood that other embodiments may employ only one inner frame section that defines a space for receiving a projection of the outer frame section. In other words, a proposed embodiment may comprise a modification to that depicted in FIG. 1 wherein the second inner frame section does not define the space 21B and wherein the outer frame section 20 does not have the second projection 20B. In this way, such an embodiment may employ an inner frame section according to an embodiment along with a second, separate (and potentially generic) inner frame section that does not define a space for receiving a projection of the outer frame section.

Also, although the embodiment of FIG. 1 has been depicted and described as employing an outer frame section that is formed as a single component (e.g. a single elongate extruded member having a generally U-shaped cross-sectional shape), it is to be understood that other embodiments may employ an outer frame section that is formed from two or more components that are brought together so as to capture the inner frame sections and sheet material therebetween. In other words, a proposed embodiment may comprise a modification to that depicted in FIG. 1, the outer frame section is formed from first and second outer frame section portions.

Figure 2:
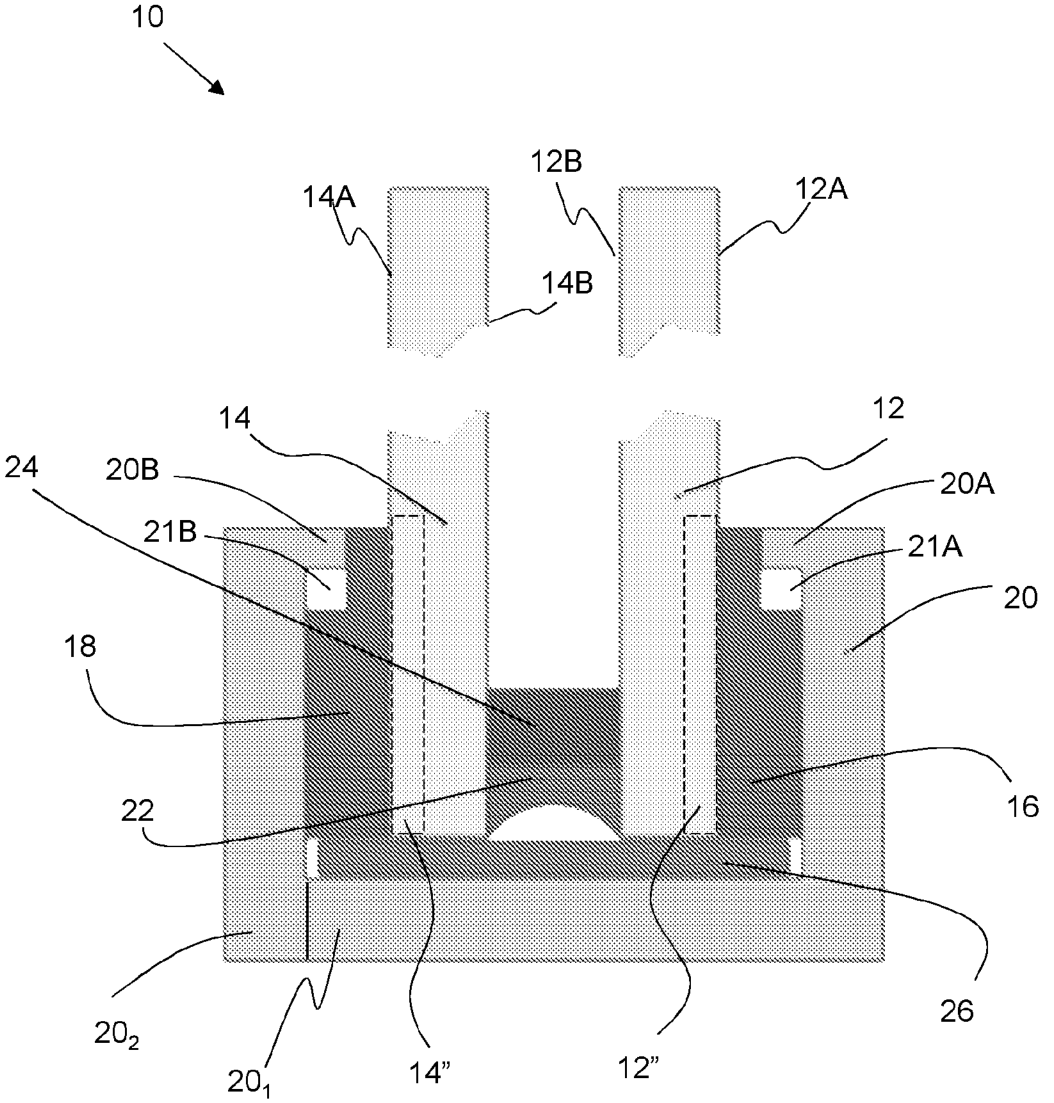
FIG. 2 illustrates a modification to the embodiment of FIG. 1.

By way of example, referring to FIG. 2, there is depicted a modification to the embodiment of FIG. 1, wherein the outer frame section 20 comprises a first outer frame sub-section $\mathbf{20}_1$ and a second outer frame sub-section $\mathbf{20}_2$.

Each of the first $\mathbf{20}_1$ and second $\mathbf{20}_2$ outer frame sub-sections comprise elongate extruded members. In this example, the first outer frame sub-section $\mathbf{20}_1$ has a generally L-shaped cross-sectional shape (with a projection 20A extending along the longitudinal length of the first outer frame sub-section $\mathbf{20}_1$). The second outer frame sub-section $\mathbf{20}_2$ has a generally rectangular cross-sectional shape (with a projection 20A extending along the longitudinal length of the second outer frame sub-section $\mathbf{20}_2$).

As depicted in FIG. 2, the first $\mathbf{20}_1$ and second $\mathbf{20}_2$ outer frame sub-sections are brought together so as to form a combined outer frame section 20 having a generally U-shaped cross-section shape and to capture the inner frame sections 16,18 and sheet material 12,14.

Thus, in the embodiment of FIG. 2, the first outer frame sub-section $\mathbf{20}_1$ is receiving the sheet material 12,14 with the inner frame sections 16,18 fitted thereon. The second outer frame sub-section $\mathbf{20}_2$ is also for receiving the sheet material with the inner frame section fitted thereon. Means to connect the first $\mathbf{20}_1$ and second $\mathbf{20}_2$ outer frame sub-sections together are provided (such as locking geometries of the inner frame sections and the outer frame sub-sections; frictional contact; bonding/adhesives; compression clamping, etc.). The first $\mathbf{20}_1$ and second $\mathbf{20}_2$ outer frame sub-sections together define a space for receiving the inner frame sections 16,18.

In this example, the first $\mathbf{20}_1$ and second $\mathbf{20}_2$ outer frame sub-sections are adapted to apply a compressive force to the inner frame sections 16,18 so to clamp the inner frame sections 16,18 and substantially prevent movement of the inner frame sections 16,18 relative to the first $\mathbf{20}_1$ and second $\mathbf{20}_2$ outer frame sub-sections. Thus, by way of example, one can apply much greater clamping pressure (i.e. compressive force) to securely hold the inner frame sections 16,18 and sheet material 12,14 in place, because the clamping pressure (or compressive force) is applied to the inner frame sections 16,18 rather than the sheet material 12,14. However, it is to be understood that in other embodiments a clamping pressure (e.g. compressive force) need not be used as the holding means. There is also provided a method of constructing a framed panel structure having one or plural parallel panels. The method of constructing may comprise the step of fitting a first inner frame section to a first peripheral portion of a first surface of a panel, wherein the first peripheral portion is adjacent a peripheral edge of the panel. Also, the method may include fitting a second, separate inner frame section to a second peripheral portion of a second surface of a panel, wherein the second peripheral portion is adjacent a peripheral edge of the panel. The panel(s) is/are arranged such that the second surface faces in an opposite direction to that of the first surface. Then, the arrangement of the panel(s) and inner frame sections are positioned (e.g. inserted or introduced) in an outer frame section such that a space defined by each of the first and second inner frame sections receives a respective projection of the outer frame section. In this way, the spaces of the first and second inner frame sections cooperate with the respective received projections of the outer frame section to restrict movement of the inner frame sections relative to the outer frame section.

Although the embodiments of FIGS. 1 and 2 have been depicted and described as employing inner frame sections each having a removed corner for receiving a lip portion of the outer frame section, it is to be understood that other embodiments may employ other designs of inner frame sections combinations of matching or complementary geometries. For example, in an alternative embodiment, at least one of the first and second inner frame sections may comprise an extruded element that is adapted to have cross-sectional shape which defines the space adapted to receive a respective projection of the outer frame section. In other words, the cross-sectional shape of an inner frame section may defined such that it provides a recess or seat along its longitudinal length so that the recess/seat is adapted to receive and cooperate with a projection of an outer frame section so as to restrict relative movement between the inner and outer frame sections.

By way of example, referring to FIGS. 3A-3D, there are depicted various modifications to the second inner frame section 18 used in the embodiments of FIGS. 1 and 2.

Figure 3A:
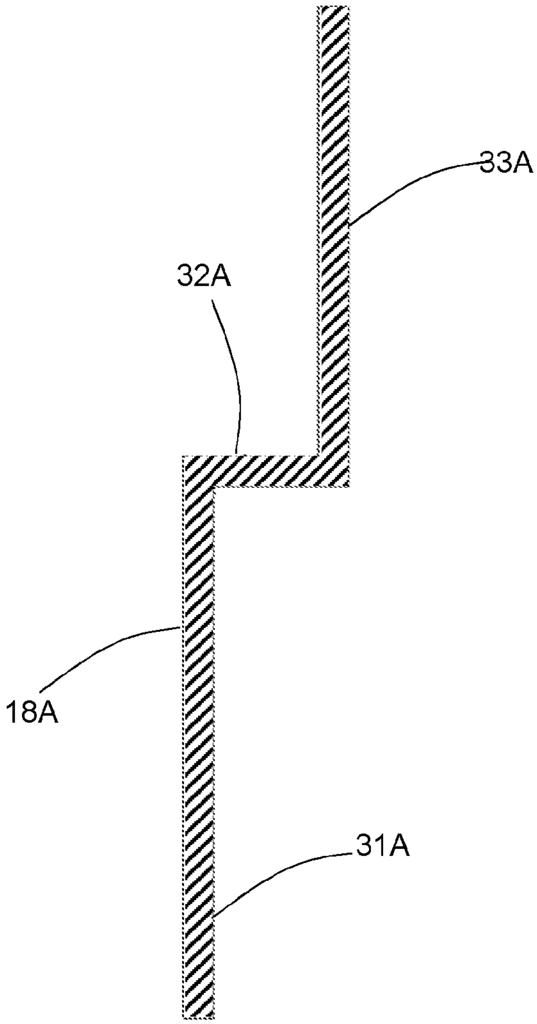
FIGS. 3A-3D show various modifications to the second inner frame section used in the embodiments of FIGS. 1 and 2.

A first variation of the inner frame section 18A is depicted in FIG. 3A. Here, the inner frame section 18A comprises an elongate member that has a cross-sectional shape (e.g. via extrusion or bending) comprising first 31A to third 33A portions. The second portion 32A is between the first 31A and third 33A portions and angled to be perpendicular to the first 31A and third 33A portions (when viewed cross-section). The first 31A and third 33A portions are substantially parallel to each other (when viewed in cross-section). Thus, the relative arrangement of the first 31A to 33A portions of the inner frame section 18A define a seat or recess similar to the space 21B in embodiments of FIGS. 1 and 2.

Figure 3B:
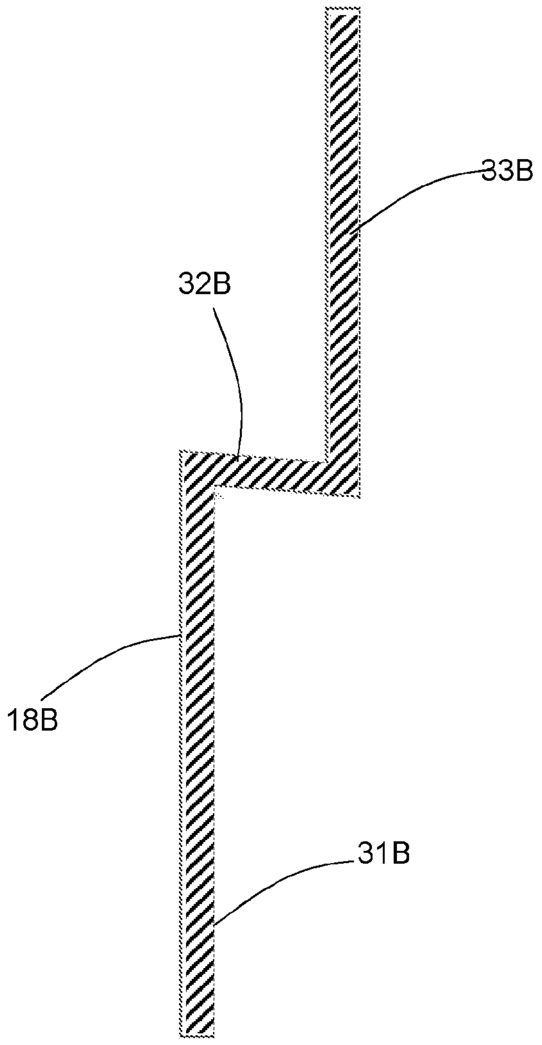

A second variation of the inner frame section 18B is depicted in FIG. 3B. Here, the inner frame section 18B comprises an elongate member that has a cross-sectional shape (e.g. via extrusion or bending) comprising first 31B to third 33B portions. The second portion 32B is between the first 31B and third 33B portions and defines an acute angle between the first 31A and third 33A portions, respectively (when viewed cross-section). In other words, the angle defined between the first 31B and second 32B portions is less than 90°, and the angle defined between the second 32B and third 33B portions is less than 90°. Again, like the embodiment of FIG. 3A, the first 31A and third 33A portions are substantially parallel to each other (when viewed in cross-section). Thus, the relative arrangement of the first 31A to 33A portions of the inner frame section 18A defines an angled seat or recess.

Figure 3C:
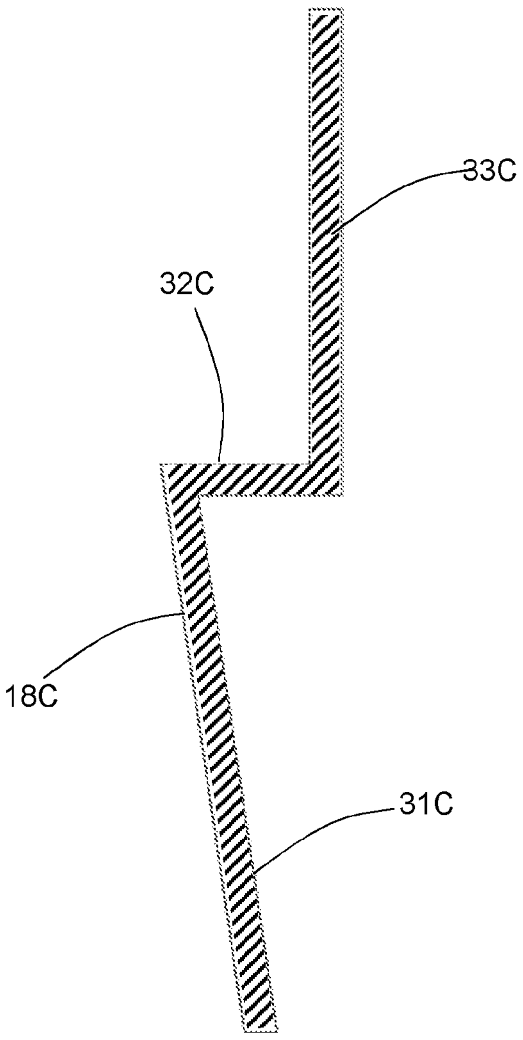

Another variation of the inner frame section 18C is depicted in FIG. 3C. Here, the inner frame section 18C comprises an elongate member that has a cross-sectional shape (e.g. via extrusion or bending) comprising first 31C to third 33C portions. The second portion 32C is between the first 31C and third 33C portions and is angled to be perpendicular to the third 33A portions and to define an acute angle between the first 31A and second 32C portions. Unlike the embodiments of FIGS. 3A and 3B, the first portion 31C is angled with respect to the third portion 33C (when viewed in cross-section).

Figure 3D:
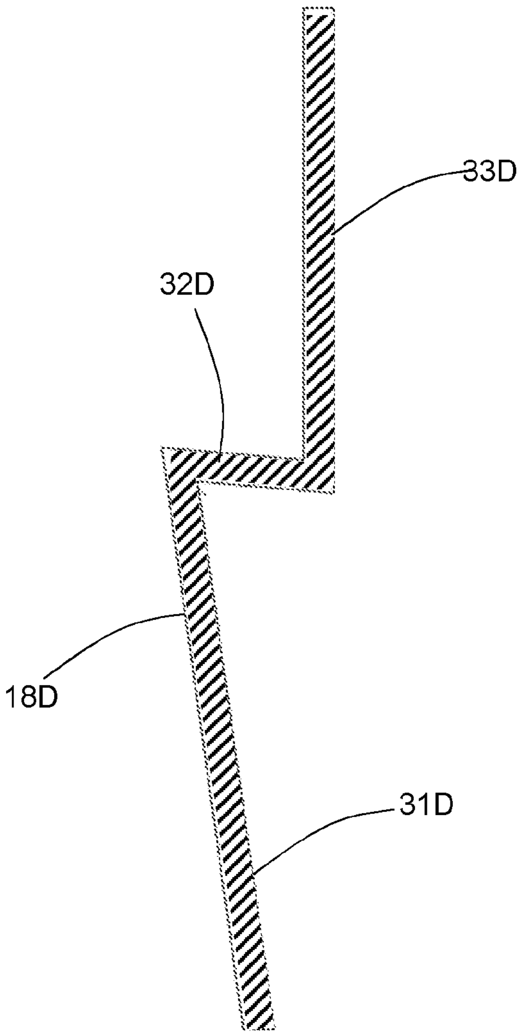

Yet another variation of the inner frame section 18D is depicted in FIG. 3D. Here, the inner frame section 18D comprises an elongate member that has a cross-sectional shape (e.g. via extrusion or bending) comprising first 31D to third 33D portions. The second portion 32D is between the first 31D and third 33D portions and is angled to define an acute angle between the second 32D and third 33D portions and to define an acute angle between the first 31D and second 32D portions. Like embodiment of FIG. 3C, the first portion 31D is angled with respect to the third portion 33D (when viewed in cross-section).

It will be understood that the depicted embodiments of FIGS. 3A-3D are exemplary, and are representative of preferred arrangements that have been found to be advantageous (e.g. in terms of their ease of manufacture, strength, weight and/or cost). Such embodiments may be thought of as having an S-shaped or Z-shaped cross-sectional shape and may, for example, be manufactured by simply extruding and/or bending an elongate element.

In particular, it is noted that the embodiments of FIGS. 1 and 2 may be thought of as employing blocks to the sheet material. Such embodiments may employ a rigid bond and 'solid' Edge Retention Profile (ERP) element. However, the inner frame section may be modified to create an arrangement that cushions the bond and reduces stress by allowing for some deformation of the bond length.

For example, the inner frame section (or ERP element) may be a carrier for a bonding silicone which allows for extensive movement under loading. To ensure that the filling of the ERP can be undertaken and allowed to again its full strength over a period of 14 days, the upper portion of the ERP may be backed with a double-sided tape that provides a strong bond. This allows immediate handling of units, with care, during the manufacturing process.

Thus, there may be proposed a move from a rigid non-flexible bond of the ERP to the sheet material (e.g. as depicted in FIGS. 1-2) to a flexible fixing to the sheet material (e.g. as depicted in FIGS. 3A-3D) using a bonding silicone and VHB tape so as to allow movement while attaining a great deal of strength over a given failure plane (e.g. movement of up to 20 mm may be catered for). The reader will appreciate that, in proposed embodiment, the outer frame section and an inner frame section fitted to sheet material cooperate to retain the inner frame section. Such cooperation of the inner and outer sections thus restricts movement of the inner frame section, and this restriction may be in the lateral direction and/or vertical direction.

The invention claimed is:

1. A frame assembly for sheet material comprising a panel defined by opposing surfaces, and one or more peripheral edges extending between the opposing surfaces, the opposing surfaces terminating at the one or more peripheral edges, the frame assembly comprising:

a first inner frame section adapted to be fitted to a first peripheral portion of a first surface of sheet material, wherein the first peripheral portion is adjacent a peripheral edge of the sheet material;

a second, inner frame section separate from the first inner frame section and adapted to be fitted to a second peripheral portion of a second surface of sheet material, wherein the second peripheral portion is adjacent the peripheral edge of the sheet material, and wherein the second surface is opposite the first surface; and an outer frame section for receiving the sheet material with the inner frame sections fitted thereto, the outer frame section comprising a first projection, wherein the first inner frame section comprises a first portion that abuts the outer frame, the first portion having a first width and a second portion having a second width, the first width greater than the second width such that the first portion and the second portion define a recess to receive the first projection, whereby the first portion abutting the outer frame section and the recess receiving the first projection to restrict movement of the first inner frame section relative to the outer frame section.

2. The frame assembly of claim 1, wherein the recess of first inner frame section and the first projection of the outer frame section are adapted to have complementary or interlocking geometries.

3. The frame assembly of claim 1 or 2, wherein the recess of the first inner frame section is larger than the received first projection in at least one dimension by a tolerance value.

4. The frame assembly of claim 3, wherein the tolerance value is greater than or equal to 5 mm.

5. The frame assembly of claim 1, wherein the outer frame section has a mouth portion into which the sheet material with the inner frame section fitted thereto is adapted to be received, and wherein the sheet material with the inner frame section fitted thereto is wider than the mouth portion.

6. The frame assembly of claim 1, wherein a cross-sectional shape of the outer frame section is substantially U-shaped.

7. The frame assembly of claim 1, wherein a cross-sectional shape of the first inner frame section is substantially S-shaped or Z-shaped.

8. The frame assembly of claim 1, wherein the first inner frame section comprises a removed corner portion which defines the recess adapted to receive the first projection of the outer frame section.

9. The frame assembly of claim 8, wherein the removed corner portion defines a seat along a longitudinal length of the first inner frame section, and wherein the first projection of the outer frame section comprises a lip which, when received by the recess, engages over the seat.

10. The frame assembly of claim 1, wherein the first inner frame section comprises a groove which defines the recess adapted to receive the first projection of the outer frame section, the first projection comprising a tongue.

11. The frame assembly of claim 1, wherein the outer frame section comprises a pocket adapted to receive the sheet material with the first inner frame section fitted thereto, and wherein a cross-sectional shape of the pocket is adapted to substantially match that of the sheet material with the first inner frame section fitted thereto.

12. The frame assembly of claim 1, wherein the outer frame section comprises a second projection, and wherein the second inner frame section comprises a first portion that abuts the outer frame having a first width and a second portion having a second width, the first width greater than the second width and defines a second recess to receive the second projection, whereby the first portion of the second inner frame section abuts the outer frame section and the second recess receives the second projection to restrict movement of the second inner frame section relative to the outer frame section.

13. The frame assembly of claim 12, wherein the sheet material comprises first and second panels, and wherein the first inner frame section is adapted to be fitted to a first peripheral portion of a first surface of the first panel, wherein the first peripheral portion is adjacent a peripheral edge of the first panel, and wherein the second inner frame section is adapted to be fitted to a second peripheral portion of a second surface of the second panel, wherein the second peripheral portion is adjacent a peripheral edge of the second panel, and wherein the second surface of the second panel is adapted to face in an opposite direction to that of the first surface of the first panel.

14. The frame assembly of claim 1, wherein the outer frame section is formed from at least two sub-sections.

15. The frame assembly of claim 1, wherein the frame assembly is a window or door frame assembly and the sheet material is at least semi-transparent.

16. The frame assembly of claim 1, wherein the inner frame sections and the outer frame section are made of at least one of: aluminium; steel; UPVC; and polymer material.

17. An inner frame section for a frame assembly for sheet material, the sheet material comprising a panel defined by opposing surfaces, and one or more peripheral edges extending between the opposing surfaces, the opposing surfaces terminating at the one or more peripheral edges, wherein the inner frame section is adapted to be fitted to a first peripheral portion of a first surface of sheet material, wherein the first peripheral portion is adjacent a peripheral edge, and wherein the inner frame section comprises a first vertical portion and a second vertical portion that define a space adapted to receive a projection of an outer frame section of the frame assembly, whereby the respective received projection contacts a portion of the space defined by the first vertical portion and the second vertical portion to restrict movement of the inner frame section relative to the outer frame section.

18. The inner frame section of claim 17, wherein the space of the inner frame section and the projection of the outer frame section are adapted to have complementary or interlocking geometries.

19. The inner frame section of claim 18, wherein the space of the inner frame section is larger than the received projection in at least one dimension by a tolerance value, and wherein the tolerance value is greater than or equal to 5 mm.

20. The inner frame section of any one of claims 17 to 19 inclusive, wherein the first vertical portion has a first width and the second vertical portion has a second width, the first width less than the second width such that the inner frame section comprises a removed corner portion which defines the space adapted to receive the projection of the outer frame section.

21. The inner frame section of claim 20 wherein the removed corner portion defines a recess or seat along a longitudinal length of the inner frame section, and wherein the projection of the outer frame section comprises a lip which, when received by the respective space, engages over the recess or seat.

22. The inner frame section of claim 17, comprising a groove which defines the space adapted to receive the projection of the outer frame section, the projection comprising a tongue.

23. A method of constructing a framed panel structure having one or plural parallel panels, wherein a panel comprises a panel defined by opposing surfaces, and one or more peripheral edges extending between the opposing surfaces, the opposing surfaces terminating at the one or more peripheral edges, and wherein the method comprises:

fitting a first inner frame section to a first peripheral portion of a first surface of a panel, wherein the first peripheral portion is adjacent a peripheral edge and comprises a first vertical portion and a second vertical portion;

fitting a second, separate inner frame section to a second peripheral portion of a second surface of a panel, wherein the second peripheral portion is adjacent a peripheral edge;

arranging the second surface to face in an opposite direction to that of the first surface; and receiving, in an outer frame section, the panel with the first inner frame section fitted thereto, such that the first vertical portion contacts the outer frame section and the first vertical portion and the second vertical portion define a space that receives a first projection of the outer frame section, whereby the space of the first inner frame section cooperates with the received first projection and the first vertical portion contacting the outer frame section cooperate to restrict movement of the received first inner frame section relative to the outer frame section.

24. The method of claim 23, wherein the step of receiving further comprises:

receiving, in an outer frame section, the panel with the first inner frame section fitted thereto, such that a space defined by a first vertical portion and a second vertical portion of the second inner frame section receives a second projection of the outer frame section, whereby the space of the second inner frame section cooperates with the received second projection to restrict movement of the received second inner frame section relative to the outer frame section.

* * * * *